W. A. GREENE.
Combined Range and Furnace.
No. 56,041.
Patented July 3, 1866.
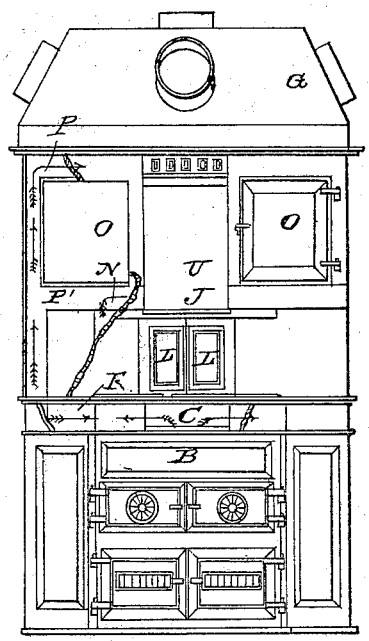
Fig. 1
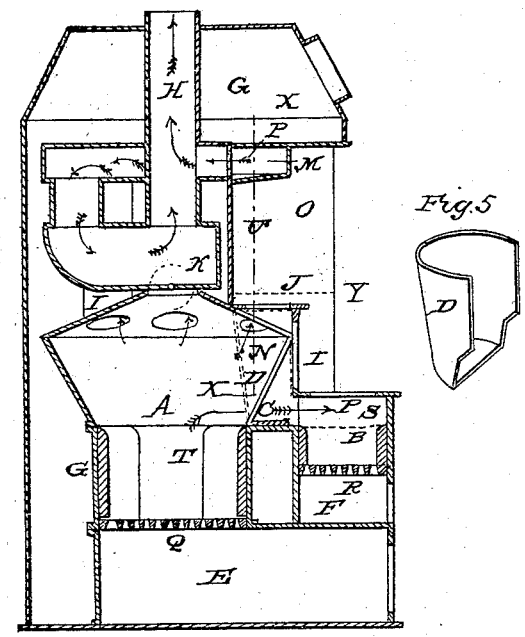
Fig. 2
Fig. 5
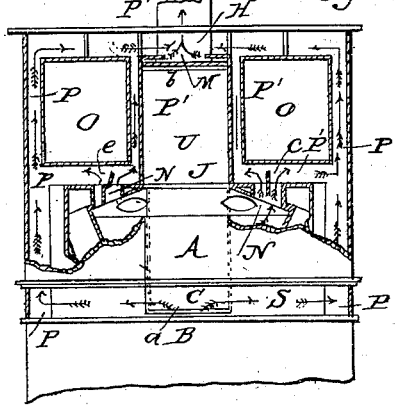
Fig. 3
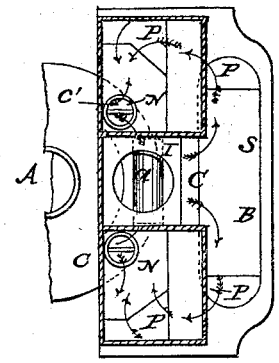
Fig. 4
Witnesses
S. L. Barney
J. Savage
Inventor
W. A. Greene

UNITED STATES PATENT OFFICE.

WILLIAM A. GREENE, OF TROY, NEW YORK.

RANGE AND FURNACE COMBINED.

Specification forming part of Letters Patent No. 56,041, dated July 3, 1866.

*To all whom it may concern:*

Be it known that I, WILLIAM A. GREENE, of Troy, in the county of Rensselaer and State of New York, have invented certain new and useful Improvements in Cooking and Heating Apparatus; and I do hereby declare that the following is a full, and exact description of the construction and operation of the same, reference being had to the annexed drawings, making a part of this specification, in which—

Figure 1 is a front elevation, the blue lines showing the outer casing or jacket forming the air-heating chamber. Fig. 2 is a vertical section of Fig. 1. Fig. 3 is a vertical sectional view taken through dotted line $x\ x$ of Fig. 2. Fig. 4 is a horizontal sectional view taken on dotted line $y\ y$ of Fig. 2, and Fig. 5 is a separate view of a partition wall or plate.

The letters of reference marked on the drawings refer to like parts in each figure.

In the usual air-heating furnaces as generally constructed and arranged for warming houses it is well known that sufficient heat for effectual cooking purposes might be taken from the furnace of the air-heater without materially decreasing its efficiency as a heating apparatus for warming apartments if a properly-arranged apparatus for cooking purposes were judiciously combined with said air-heater, which would thereby save the coal required in a separate cooking apparatus operating by itself—particularly so in the winter season of the year.

In view of the advantages to be gained by such improvements, endeavors have been made heretofore to accomplish so desirable an object; but the combinations and arrangements as before made and introduced to the public have, from erroneous construction and arrangements, proved in practical use materially defective in one very important particular—that, although they might cook readily and well, still they failed to comfortably warm the several rooms of a house in the winter season.

My object is to remedy such a serious defect.

The nature of my invention consists in the peculiar manner in which I combine an air-heating and cooking apparatus, as hereinafter fully shown, so that its principle of operation is to take all the heat necessary to effectual cooking operations from the combustion-chamber of the air-heating furnace, which heat, after circulating through the boiler and oven-flues of the cooking apparatus, is caused, whenever so desired, to re-enter the combustion-chamber of said heater-furnace, and none or very little of said heat for warming purposes is wasted, and the coal required in a separate cooking apparatus is, in the winter season, entirely saved, and at the same time the apartments of the house are effectually warmed.

For use in cooking in summer and the milder seasons of the year, a smaller and separate fire-box or furnace, complete in all its parts, and operating, whenever desired, independently of or conjointly with the large or air-heating furnace, is provided and combined with said cooking apparatus, so that cooking in the mild parts of the year may be accomplished economically by the aid of said small furnace, and, simultaneously with the cooking operations, furnish hot air to comfortably warm apartments in the spring and autumn months of the year, thereby saving the greater expense of operating the large furnace for said purposes during those months when only a moderate heat is required for comfort, or, when a great amount of heat is required in severe cold weather, it may operate conjointly with the large furnace of the heater, and so furnish an increased quantity of heat.

To enable others skilled in the art of constructing heating and cooking apparatus to construct and use my invention, I will now fully describe its construction and operation, as follows:

A heater furnace or apparatus constituted of fire-pot T, combustion-chamber A, and radiator pipes or flues I, all encompassed by a jacket or casing, forming an air-heating chamber, G, with the requisite supply and distributing pipes attached thereto, all of which parts are constructed and arranged in the usual known manner for the purpose of heating or warming rooms. In front of said heating apparatus, and connected therewith, is a supplemental fire-box, B, provided with a separate grate, R, ash-pit F, and otherwise complete in all its parts, which are arranged in manner substantially as shown in Figs. 1 and 2, so that it may in the warm season of the year, or whenever desired, operate for cooking purposes independently of the larger or heater furnace; or, if more heating capacity is at any time wanted for warming or cooking purposes, it may then operate conjointly with the larger furnace.

Over the combustion or heating chamber S and flues P of this small fire-pot B is arranged a top plate provided with a range of boiler-holes for receiving vessels for cooking operations. Above the boiler-holes, and extending back toward and over the central parts of the main combustion-chamber A, is placed a range of ovens, O O, for baking purposes. They are surrounded by oven-flues P' P', which connect directly, whenever desired, with the combustion-chamber A of the main fire-box by means of the direct flues N N', provided with the dampers c and c'. Between these ovens there is a recess, U. The upper part forms a take-up flue, M.

The combustion-chamber A of the main fire-pot T is connected with the combustion-chamber S of the supplemental fire-pot B by means of the connecting-chamber or main flue C, which is formed by the combined arrangement of the top plate, J, front plate and doors, L L, and side plates, w w, and bottom plate, x, in manner substantially as shown in Fig. 2 of annexed drawings. Within the throat of this said chamber or flue C is arranged a rolling damper, a, by the operation of which, whenever desired, communication is either opened or closed between said combustion-chambers A and B. Immediately above the main flue C is a plate provided with doors L L, which are constructed to slide, one to the right, the other to the left, in the usual manner. On top of this plate and sliding doors is placed the top plate, J, provided with a boiler-hole opening into the combustion-chamber A. This plate J is constructed so as to be removable whenever desired. Communication is had with the combustion-chamber A and fire-pot T through the opening made by sliding back the doors L L, and the fire in said fire-pot is replenished or regulated through the same.

Fig. 5 shows a perspective view of a partition plate or wall, and as removed from the proper place occupied by it when in use. This partition plate or wall D is used for the purpose of closing all communication between the combustion-chamber A of the heater-furnace and the combustion or heating chamber S of the supplemental fire-box B, as provided by means of said main flue C, when fire is wanted merely for cooking purposes in summer, and then this partition-plate occupies the position as shown by the dotted lines at D in Fig. 2, and thereby, in combination with the top plate, J, and sliding doors L L, forms of the aforesaid connecting chamber or flue C useful additional room to the combustion-chamber of said supplemental fire-box B, increasing its capacity for cooking operations by bringing into use with said fire-box B the boiler-hole in said plate J. The products of combustion from the operation of this said supplemental fire-box B escape into the take-up flue M in manner as follows: Fire being kindled in the said supplemental fire-box B, the products of combustion rising therefrom divide and pass, part to the right and part to the left, under the top plate of said fire-box B, in manner as shown by the arrows in Figs. 1 and 3 of annexed drawings. The said divided currents then, respectively, at P P in Fig. 3, deflect and pass upward through the respective oven-flues P' P' P' P', thereby heating said ovens for baking purposes. From thence they respectively pass through the openings made by the respective rolling dampers b b' into the take-up flue M, where said divided products of combustion reunite and pass on into the main exit-flue H, all in manner as shown by the arrows in said Figs. 1, 2, and 3.

In the summer months of the year, when all the fire required is simply for cooking purposes, and in the spring and early autumn months, whenever a moderate heat is required to prevent the rooms of the house from getting too cold, heat is furnished from the fire in the small fire-box B, and the extra expense of maintaining a fire in the large furnace is saved, as a bright efficient fire could not be kept in said large furnace in the warm and mild months of the year without consuming much more coal than would be actually needed merely for cooking purposes; hence the economy and convenience of the employment of the supplemental or small fire-box B in the summer months of the year.

The operation of this improved heating and cooking apparatus is as follows: For ordinary winter weather a fire is kept in the large fire-pot T, the damper K being closed. The heated products of combustion enter the radiator-pipes and circulate through the same, radiating the heat and heating the air within the chamber G, all in the usual manner.

For cooking operations, such as boiling and baking or roasting, turn down the damper a, thus opening communication through the flue C. The heated gases pass from the combustion-chamber A in manner and directions as shown by the arrows in the annexed drawings, thereby heating the kettles placed in the range of boiler-holes over the supplemental fire-pot B, and then passing upward through the oven-flues P' P', heating the ovens O O for baking.

Whenever extra heat is wanted for the ovens the dampers c c' in flues N N' are opened, and heat passes directly from the combustion-chamber A through the oven-flues P' P', as herein shown. The heat, after passing under the boilers and through the oven-flues, enters the flue M, which conducts it into the radiator-pipes or exit-flue H.

For summer use remove the plate J, then place the partition plate or wall D into its proper position, as shown by the dotted lines D in Fig. 2. The top plate, J, is then readjusted in its place, and the doors L L closed, thereby forming of the aforesaid connecting-chamber or main flue C useful additional room to the combustion-chamber S of said supplemental fire-box B, for the purpose as hereinbefore described.

The cooking apparatus is now in readiness for summer use. Fire is then made in the small fire-box B, which fully serves all the purposes of boiling and baking, and also, whenever a moderate warmth is wanted in the rooms of the house, the fire in the small firebox furnishes sufficient heat to heat the radiating surfaces and pipes to heat the air for such purposes.

In very severe cold weather, when an abundance of warmth is required for comfort, the supplemental fire-box B may be made to operate conjointly with the larger heater firebox T, and so produce an abundance of warm air in the several rooms of a house.

Whenever it is desired to have the heat passing through the flue C, after circulating around the ovens through the oven-flues P' P', reenter the combustion-chamber A, and pass to the exit-pipe through the radiator-pipes, it is effected by closing the dampers $b$ $b'$, thus shutting off direct communication with the exit-pipe and opening dampers $c$ and $c'$. The heat then circulates slowly about the ovens, and, descending, passes through the flues N N' into the combustion-chamber A, and passes from thence into the radiator-pipes and exit-flue H.

Having fully described my improved cooking and heating apparatus, what I claim as my invention therein, and desire to secure by Letters Patent, is—

1. In combination with the oven-flues P' P' and combustion-chamber A, the direct communication-flue N, arranged in manner substantially and for the purposes as herein set forth.

2. The removable partition plate or wall D, or its equivalent device, arranged in manner substantially and for the purpose as herein specified.

3. In combination with the removable partition-plate D, or its equivalent device, and the flue C, the arrangement of the boiler-hole plate J and the sliding doors L L, for the purpose of forming additional fire-chamber space, in manner substantially and for the purposes as herein set forth.

4. In combination with the oven-flues P' P' and direct flue N, the arrangement of the dampers $b$ and $c$, to operate with reference to each other in manner and for the purpose as herein shown.

WM. A. GREENE.

Witnesses:
I. L. BARNEY,
J. J. SAVAGE.